United States Patent
Dong et al.

(10) Patent No.: US 12,101,862 B2
(45) Date of Patent: Sep. 24, 2024

(54) FAN LAMP CONTROL SYSTEM AND METHOD

(71) Applicant: SHENZHEN INTELTRON INTELLIGENT SCIENCE & TECHNOLOGY CO., LTD., Guangdong (CN)

(72) Inventors: Xiaoyong Dong, Guangdong (CN); Bo Tang, Guangdong (CN); Dongqing Huang, Guangdong (CN)

(73) Assignee: SHENZHEN INTELTRON INTELLIGENT SCIENCE & TECHNOLOGY CO., LTD., Guangdong (CN)

( * ) Notice: Subject to any disclaimer, the term of this patent is extended or adjusted under 35 U.S.C. 154(b) by 24 days.

(21) Appl. No.: 18/097,672

(22) Filed: Jan. 17, 2023

(65) Prior Publication Data

US 2023/0171866 A1    Jun. 1, 2023

Related U.S. Application Data

(63) Continuation of application No. PCT/CN2022/076487, filed on Feb. 16, 2022.

(30) Foreign Application Priority Data

Aug. 7, 2021    (CN) .......................... 202110904959.8

(51) Int. Cl.
   *F21V 33/00*    (2006.01)
   *F04D 25/06*    (2006.01)
   (Continued)

(52) U.S. Cl.
   CPC ............ *H05B 47/17* (2020.01); *F04D 25/06* (2013.01); *F21V 33/0096* (2013.01); *H05B 47/175* (2020.01); *H05B 47/1965* (2024.01)

(58) Field of Classification Search
   CPC .... F04D 25/06; F04D 25/088; F21V 33/0096; H05B 47/17; H05B 47/175; H05B 47/19; H05B 47/195; H05B 47/1965
   See application file for complete search history.

(56) References Cited

U.S. PATENT DOCUMENTS 5,458,311  A  * 10/1995  Holbrook ............... H05B 47/10
                                                        D14/174
6,120,262  A  *  9/2000  McDonough .......... H05B 47/19
                                                        318/16
(Continued)

FOREIGN PATENT DOCUMENTS

CN     206498571 U    9/2017
CN     108591106 A    9/2018
(Continued)

OTHER PUBLICATIONS

International Search Report of Corresponding Application PCT/CN2022/076487, mailed May 19, 2022, 5 pages.

*Primary Examiner* — Levi Gannon
(74) *Attorney, Agent, or Firm* — Cooper Legal Group, LLC

(57) ABSTRACT

The present application relates to a fan lamp control system and method, and the system includes: a control module, a processing module, a fan module, a lamp panel module and a power supply module; the fan module is configured for controlling a rotating state of a fan; the lamp panel module is configured for controlling an illuminating state of a lamp; the control module is configured for sending a control instruction for controlling the rotating state of the fan and the illuminating state of the lamp; the control module includes a first control unit and a second control unit; the processing module is configured for controlling the fan module and the (Continued)

lamp panel module to perform a corresponding operation based on the control instruction.

8 Claims, 9 Drawing Sheets

(51) Int. Cl.
*H05B 47/17* (2020.01)
*H05B 47/175* (2020.01)

(56) References Cited

U.S. PATENT DOCUMENTS

| | | | |
|---|---|---|---|
| 10,954,948 B1 | 3/2021 | Lowe et al. | |
| 2009/0028372 A1 | 1/2009 | Cerasuolo | |
| 2017/0115019 A1* | 4/2017 | Desmet | H05B 47/115 |
| 2018/0116040 A1* | 4/2018 | Mann | G08C 17/02 |
| 2018/0364665 A1* | 12/2018 | Clymer | F24F 11/523 |
| 2019/0043502 A1* | 2/2019 | Chen | G10L 15/22 |
| 2019/0219059 A1 | 7/2019 | Stefankiewicz et al. | |

FOREIGN PATENT DOCUMENTS

| | | |
|---|---|---|
| CN | 208442066 U | 1/2019 |
| CN | 110162124 A | 8/2019 |
| CN | 111078595 A | 4/2020 |
| CN | 211509343 U | 9/2020 |
| CN | 112216088 A | 1/2021 |
| CN | 212838457 U | 3/2021 |
| CN | 113653661 A | 11/2021 |
| CN | 113931861 A | 1/2022 |

* cited by examiner

FAN LAMP CONTROL SYSTEM AND METHOD

CROSS-REFERENCE TO RELATED APPLICATION

This application is a continuation of PCT application No. PCT/CN2022/076487, filed on Feb. 16, 2022, which claims the priority and benefit of China patent application No. 202110904959.8, filed on Aug. 7, 2021. The entirety of PCT application No. PCT/CN2022/076487 and China patent application No. 202110904959.8 are hereby incorporated by reference herein and made a part of this specification.

TECHNICAL FIELD

The present application relates to a field of fan lamp control, and in particularly, relates to a fan lamp control system and method.

BACKGROUND ART

A fan lamp, also known as a deluxe decorative ceiling fan, is a common domestic appliance, and is a combination of a fan and a lamp. The fan and the lamp can be controlled respectively with a switch, so that the fan lamp not only has an effect of illumination, but also has an effect of blowing. Generally, it is used as an auxiliary electric appliance.

For the fan lamp in the existing technology, a rotating speed of the fan lamp powered by a high voltage motor, such as 220 V DC motor, cannot be adjusted, or can be adjusted simply by using a remote controller. An illuminating state control method of the fan lamp is the same.

In the above related technology, the inventor believes that when the remote controller fails, a rotating state and the illuminating state cannot be adjusted according to a user need, which is inconvenient, thus it needs to be improved.

SUMMARY

In order to facilitate adjustment of a rotating state and an illuminating state of a fan lamp in real time, the present application provides a fan lamp control system and method.

First, the fan lamp control system according to the present application adopts the following technical solutions.

The fan lamp control system includes a control module, a processing module, a fan module, a lamp panel module and a power supply module; the control module is connected to the processing module, and the processing module is connected to the fan module and the lamp panel module respectively, and the power supply module is connected to the control module, the processing module, the fan module and the lamp panel module;

the fan module is configured for controlling a rotating state of a fan;

the lamp panel module is configured for controlling an illuminating state of a lamp;

the control module is configured for sending a control instruction for controlling the rotating state of the fan and the illuminating state of the lamp; the control module comprises a first control unit and a second control unit;

the processing module is configured for controlling the fan module and the lamp panel module to perform a corresponding operation based on the control instruction.

In the above technical solutions, both of the first control unit and the second control unit can receives the control instruction of a user, and send the control instruction to the processing unit. The processing unit controls the fan module and/or the lamp panel module to perform the corresponding operation based on the control instruction. By providing two control modes, when the first control unit is unavailable, automatically switching to the second control unit for control, which improves a versatility and stability of the system and makes it convenient for the user to adjust the rotating state and the illuminating state of the fan lamp in real time.

In some embodiments, the first control unit is a remote controller, and the second control unit is a terminal; the control instruction for controlling the rotating state of the fan and the illuminating state of the lamp is sent by the remote controller or the terminal; the control module further includes:

an acquisition unit, which is connected to the remote controller and configured for acquiring location information of the remote controller; the location information comprises distance information and barrier information;

an analysis unit, which is connected to the acquisition unit 13 and configured for analyzing the location information to obtain an analysis result;

a detection unit, which is connected to the remote controller and configured for detecting an operation state of the remote controller according to the analysis result to obtain a detection result; and, a control unit, which is configured for determining a control mode as a remote controller control mode or a terminal control mode based on the analysis result and the detection result, and generating the control instruction.

In the above technical solutions, the analysis unit analyzes the location information of the remote controller, and the detection unit detects the operation state of the remote controller. When the detection unit determines that the remote controller is available, the control unit selects the remote controller for control, and the remote controller adjusts the illuminating state and the rotating state of the fan lamp by sending the control instruction to the processing module. When the detection unit determines that the remote controller is unavailable, the control unit establishes the communication connection between the fan lamp and the terminal, and selects the terminal for control. When the remote controller is unavailable, automatically switching to the terminal control mode, so that the user can control the fan lamp in real time.

In some embodiments, the analysis unit is further configured for, after acquiring the distance information of the remote controller, determining a distance between the remote controller and the fan lamp, and determining whether the distance between the remote controller and the fan lamp exceeds a control range of the remote controller;

the analysis unit is further configured for, when the distance between the remote controller and the fan lamp exceeds the control range of the remote controller, determining that the remote controller is unavailable;

the analysis unit is further configured for, when the distance between the remote controller and the fan lamp does not exceed the control range of the remote controller, acquiring the barrier information of the remote controller, and determining whether there is a barrier wall between the remote controller and the fan lamp;

the analysis unit is further configured for, when there is the barrier wall between the remote controller and the fan lamp, determining that the remote controller is unavailable;

the analysis unit is further configured for, when there is no barrier wall between the remote controller and the fan lamp, determining that the location information of the remote controller is normal.

In some embodiments, the detection unit is further configured for:

after the analysis unit determines that the location information of the remote controller is normal, detecting the operation state of the remote controller;

when the remote controller is in a normal operation state, determining that the remote controller is available;

when the remote controller is in an abnormal operation state, determining that the remote controller is unavailable.

In some embodiments, the control unit is further configured for:

when the detection unit determines that the remote controller is available, determining that the control mode is a remote controller control mode;

when the analysis unit or the detection unit determines that the remote controller is unavailable, establishing a communication connection between the fan lamp and the terminal, and determining that the control mode is a terminal control mode.

In some embodiments, the processing module includes:

a main processing unit, which is configured for receiving the control instruction sent by the control module, and generating a fan control instruction and a lamp panel control instruction based on the control instruction;

a fan processing unit, which is connected to the main processing unit, and configured for receiving the fan control instruction sent by the main processing unit and generating the fan adjusting instruction;

a lamp processing unit, which is connected to the main processing unit, and configured for receiving the lamp panel control instruction sent by the main processing unit and generating the lamp adjusting instruction.

In the above technical solutions, the fan processing unit generates the fan adjusting instruction according to the fan control instruction, and controls the rotating state of the fan through the fan adjusting instruction. The lamp processing unit generates the lamp adjusting instruction according to the lamp panel control instruction, and controls the illuminating state of the lamp through the lamp adjusting instruction. The rotating state of the fan and the illuminating state of the lamp are controlled separately, which is more accurate.

In some embodiments, the fan module includes:

a motor, which is a 220 V DC motor;

a driving unit, which is connected to the fan processing unit and the motor respectively, and configured for adjusting a rotating state of the motor based on the fan adjusting instruction.

In the above technical solutions, the driving unit is connected to the fan processing unit, and receives the fan adjusting instruction sent by the fan processing unit, and can adjust the fan rotating state according to a user need.

In some embodiments, the lamp panel module includes:

an LED unit, which is connected to the lamp processing unit, and configured for adjusting an illuminating state of the LED unit based on the lamp adjusting instruction;

an LED driving power, which is configured for supplying power to the LED unit.

In the above technical solutions, the LED driving power supplies power to the LED unit, which provides an illumination. The LED unit is connected to the lamp processing unit, which can adjust the illuminating state according to the actual user need.

Second, the present application provides a fan lamp control method, adopting the following technical solutions.

The fan lamp control method, includes the following steps:

determining a control mode of a fan lamp, including a remote controller control mode and a terminal control mode;

generating a control instruction based on the control mode, including a fan control instruction and a lamp panel control instruction;

controlling a rotating state of the fan lamp based on the fan control instruction, and controlling an illuminating state of the fan lamp based on the lamp panel control instruction In the above technical solutions, both of the remote controller control mode and the terminal control mode can control the remote controller. If the remote controller fails when using, the terminal can be selected for control. After determining the control mode, the control instruction is generated, so that the rotating state and the illuminating state of the fan lamp can be adjusted according to the control instruction. The two switchable control modes improve the versatility and stability of the system and make it convenient for the user to adjust the rotating state and the illuminating state of the fan lamp in real time.

In some embodiments, the determining the control mode of the fan lamp includes the following steps:

acquiring location information of the remote controller, and analyzing the location information, so as to obtain an analysis result; the location information comprises distance information and barrier information;

detecting an operation state based on the analysis result to obtain a detection result;

determining the control mode of the fan lamp based on the analysis result and the detection result.

In the above technical solutions, analyzing the location information of the remote controller, and detecting the operation state of the remote controller, and determining whether the remote controller is available according to the analysis result and the detection result. When determining the remote controller is available, selecting the remote controller for control, and sending the control instruction by using the remote controller to adjust the illuminating state and the rotating state of the fan lamp. When determining the remote controller is unavailable, establishing the communication connection between the fan lamp and the terminal, and selecting the terminal for control, and the user can adjust the illuminating state and the rotating state of the fan lamp by using the terminal. When the remote controller is unavailable, the fan lamp is automatically switched to the terminal control mode as the control mode of the fan lamp, which improves the versatility and stability of the system and is convenient for the user to adjust the rotating state and the illuminating state of the fan lamp in real time.

DETAILED DESCRIPTION

The present application is further described in detail below in combination with FIGS. 1-10.

Figure 1:
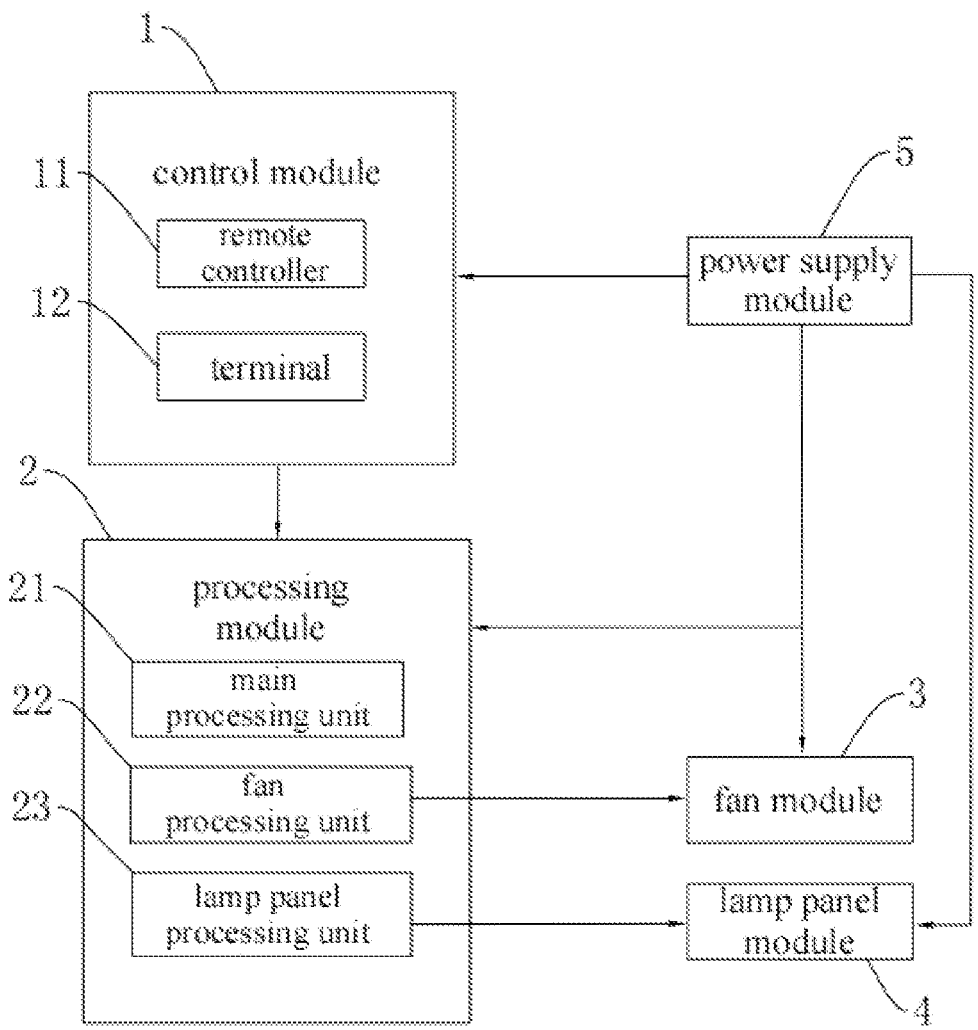
FIG. 1 is a diagram of an overall structure of the fan lamp control system according to embodiments of the present application.

The embodiments of the present application disclose a fan lamp control system, referring to FIG. 1, including a control module 1, a processing module 2, a fan module 3, a lamp panel module 4 and a power supply module 5. The control module 1 is connected to the processing module 2, and the processing module 2 is connected to the fan module 3 and the lamp panel module 4 respectively, and the power supply module 5 is connected to the control module 1, the processing module 2, the fan module 3 and the lamp panel module 4.

In particular, the fan module 3 is configured for controlling a rotating state of a fan. The lamp panel module 4 is configured for controlling an illuminating state of a lamp. The control module 1 is configured for sending a control instruction for controlling the rotating state of the fan and the illuminating state of the lamp. The processing module 2 is configured for controlling the fan module 3 and the lamp panel module 4 to perform a corresponding operation based on the control instruction.

Figure 2:
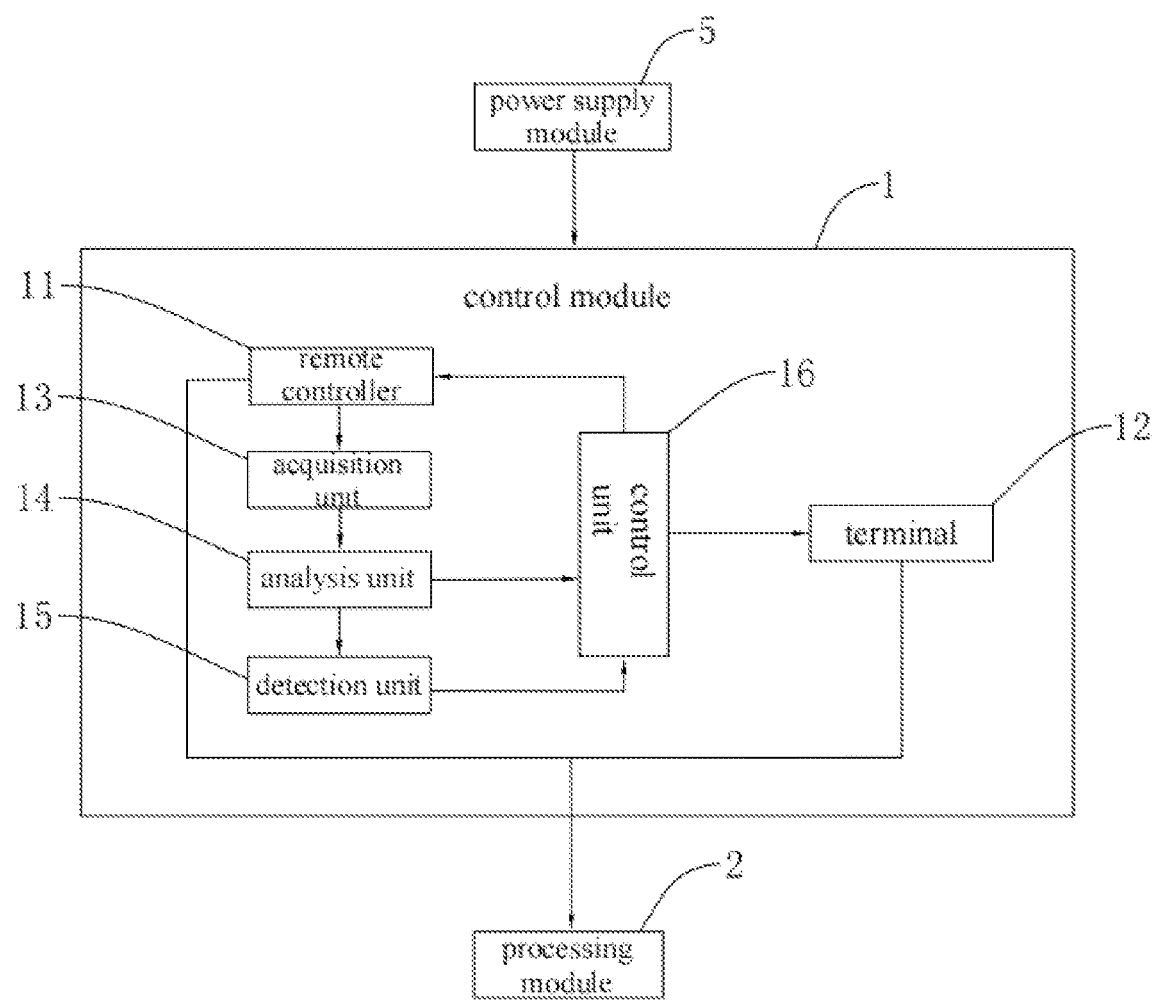
FIG. 2 is a diagram of a structure of the control module of the fan lamp control system according to embodiments of the present application.

Specifically, referring to FIGS. 1 and 2, the control module 1 includes a first control unit and a second control unit. In this embodiment, the first control unit is a remote controller 11, and the second control unit is a terminal 12. In particular, the remote controller 11 is connected to the processing module 2, and the terminal 12 also is connected to the processing module 2. A user sends the control instruction to the remote controller 11 and the terminal 12 to adjust a rotating speed of the fan and/or the illuminating state of the lamp.

More specifically, an infrared connecting port is provided in the remote controller 11, which is connected to the processing module 2. The remote controller 11 is provided with remote control buttons, respectively located in a fan adjusting area and a lamp adjusting area. The remote control buttons located in the fan adjusting area include a fan switch button for turning on/off the fan and a speed adjusting button for controlling the rotating speed of the fan. The remote controller buttons located in the lamp adjusting area include a lamp switch button for turning on/off the lamp and an adjusting button for controlling a brightness of the lamp. The user can press the corresponding button as required, then the remote controller 11 generates the corresponding control instruction and sends the control instruction to the infrared connecting port through a radio signal, and the infrared connecting port sends the control instruction to the processing module 2. In this embodiment, the control instruction includes a fan control instruction and a lamp panel control instruction.

More specifically, the terminal 12 includes a wireless connecting port connected to the processing module 2. In this embodiment, the terminal 12 can be a mobile phone, a tablet PC or a computer, installed with an APP control soft wear. The APP control soft wear contains a fan control area and a lamp control area. The fan control area contains a fan switch option for turning on/off the fan and a speed adjusting option for controlling the rotating speed of the fan. The lamp control area contains a lamp switch option for turning on/off the lamp and an adjusting option for controlling the brightness of the lamp. The user can click the corresponding option as actual required to generate the control instruction, then the mobile phone sends the control instruction to the wireless connecting port through a wireless LAN, and the wireless connecting port sends the control instruction to the processing module 2.

Specifically, referring to FIGS. 1 and 2, the control module 1 further includes an acquisition unit 13, an analysis unit 14, a detection unit 15 and a control unit 16. In particular, the acquisition unit 13 is in communication connection with the remote controller, and configured for acquiring location information of the remote controller; the analysis unit 14 is configured for analyzing the location information to determine whether the location information of the remote controller is normal; the detection unit 15 is configured for detecting an operation state of the remote controller 11.

Figure 3:
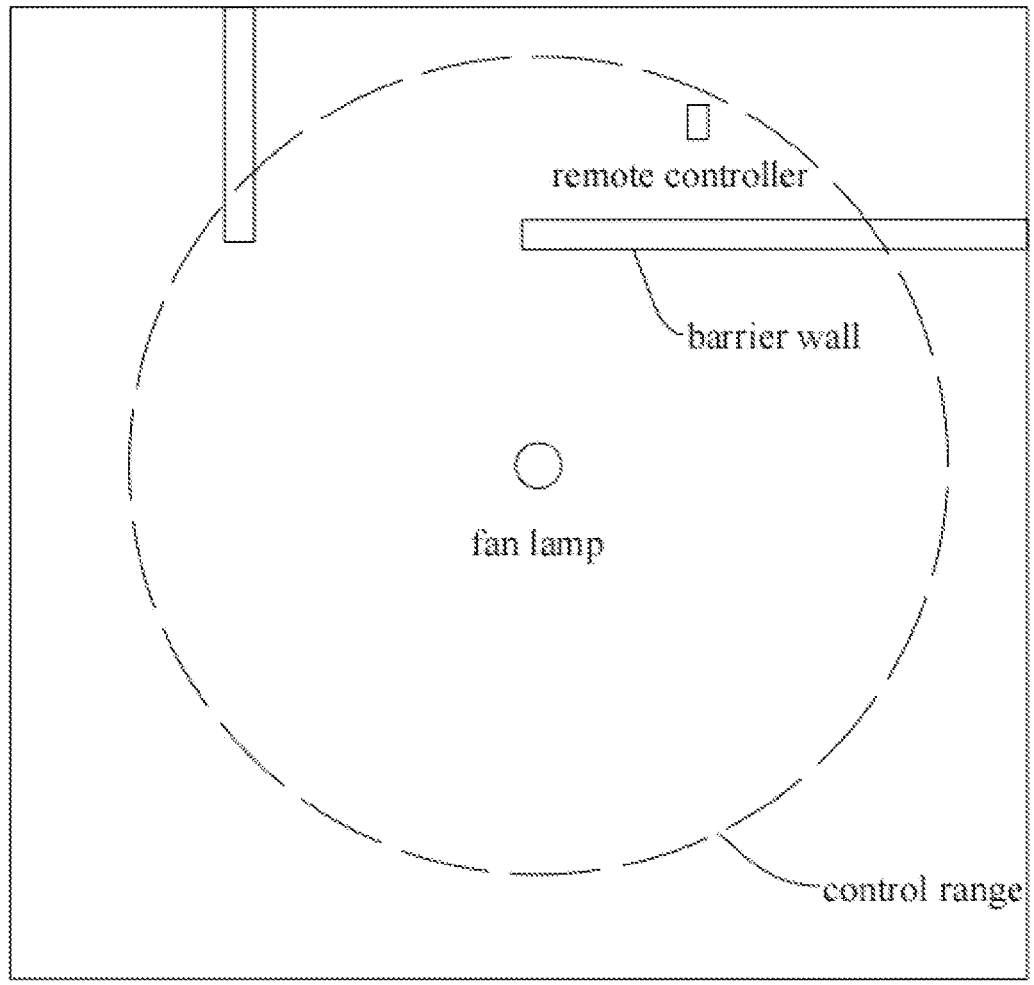
FIG. 3 is a diagram of a location model established by using a floor plan for mounting a fan lamp of the fan lamp control system according to embodiments of the present application.

More specifically, referring to FIGS. 2 and 3, a location model is established by using a floor plan for mounting the fan lamp. The acquisition unit 13 acquires the location information of the remote controller 11 in the location model. In this embodiment, the location information includes distance information and barrier information. The distance information indicates a distance between the remote controller 11 and the fan lamp, and the barrier information indicates whether there is a barrier wall between the remote controller 11 and the fan lamp. A control distance of the remote controller 11 is limited, for example, the control distance of the remote controller 11 is 8 m. If the distance between the remote controller 11 and the fan lamp is greater than 8 m, the remote controller 11 is unavailable; if the distance between remote controller 11 and the fan lamp is less than 8 m, the remote controller 11 can control the rotating state and the illuminating state of the fan lamp when there is no barrier wall. A circular control range is established by taking the fan lamp as a center of a circle and 8 m as a radius. The analysis unit 14 analyzes a location of the remote controller 11, if the remote controller exceeds the control range, the remote controller 11 is unavailable; if the remote controller 11 is in the control range, and the remote controller 11 can control the rotating state and the illuminating state of the fan lamp when there is no barrier wall.

In this embodiment, using an indoor positioning technology to position the remote controller 11 and the fan lamp, and detect the distance between the remote controller 11 and the fan lamp. The available indoor positioning technology includes but is not limited to: infrared positioning technology, ultrasonic indoor positioning technology, radio frequency identification indoor positioning technology, bluetooth indoor positioning technology, WIFI indoor positioning technology, ultra wide band indoor positioning technology and ZigBee indoor positioning technology.

More specifically, when the remote controller 11 is in the control range, it is also necessary to analyze the barrier information. The analysis unit 14 determines whether there is the barrier wall between the remote controller 11 and the fan lamp. If there is the barrier wall, the analysis unit 14 determines that the remote controller 11 is unavailable. If there is no barrier wall, the analysis unit 14 determines that the location information of the remote controller 11 is normal. In this embodiment, determining whether there is the barrier wall between the remote controller 11 and the fan lamp by using a way of infrared detection. The fan lamp can be mounted with an infrared emitter, and the remote controller 11 can be mounted with an optical sensor for receiving an infrared signal emitted by the infrared emitter. If the infrared signal can be received, it is determined that there is no barrier wall between the remote controller 11 and the fan lamp; if the infrared signal cannot be received, it is determined that there is the barrier wall between the remote controller 11 and the fan lamp.

More specifically, after the analysis unit 14 determines that the location information of the remote controller 11 is normal, the detection unit 15 detects the operation state of the remote controller 11, i.e., determining whether the remote control 11 fails. After the user presses the button of the remote controller 11, the remote controller 11 sends the control instruction to the processing module 2 and the detecting unit 15 at the same time, and the detecting unit 15 determines whether the remote controller 11 is in the normal operation state according to whether the fan lamp reacts. After the remote controller 11 sends the control instruction, if it is detected that the fan lamp performs the corresponding operation by using the detection unit 15, it is determined that the remote controller 11 is in the normal operation state, that is, the detection unit 15 determines that the remote controller 11 is available. If it is detected that the fan lamp does not perform the corresponding operation by using the detection unit 15, it is determined that the remote controller 11 is in an abnormal operation state, that is, the detection unit 15 determines that the remote controller 11 fails and is unavailable. For example, the user presses the lamp switch button of the remote controller 11, if the lamp of the fan lamp is not turned on, it is determined that the remote controller 11 is unavailable; if the lamp of the fan lamp is turned on, it is determined that the remote controller 11 is available.

More specifically, the control unit 16 determines a control mode according to an analysis result of the analysis unit 14 and a detection result of the detection unit 15. When the detection unit 15 determines that the remote controller is available, the control unit 16 directly determines that the control mode of the fan lamp is a remote controller control mode. When the analysis unit 14 or the detection unit 15 determines that the remote controller is unavailable, the control unit 16 establishes the communication connection between the fan lamp and the terminal 12 by using the processing module, and determines that the control mode is a terminal control mode.

Specifically, referring to FIG. 1, the processing module 2 includes a main processing unit 21, a fan processing unit 22 and a lamp processing unit 23. In particular, the main processing unit 21 is connected to the remote controller 11 and the terminal 12 respectively to receive the control instruction sent by the remote controller 11 and/or the terminal 12. The main processing unit 21 sends the fan control instruction to the fan processing unit 22 and the lamp panel control instruction to the lamp processing unit 23.

More specifically, the main processing unit 21 can be a single-chip. By inputting a program in the single-chip, the fan control instruction can be sent to the fan processing unit 22, and the lamp panel control instruction can be sent to the lamp processing unit 23, so that the fan processing unit 22 and the lamp processing unit 23 can respond to the corresponding control instruction.

More specifically, the fan processing unit 22 can be the single-chip. In this embodiment, the fan processing unit 22 receives the fan control instruction sent by the main processing unit, and generates a fan adjusting instruction based on the fan control instruction, and controls the fan to perform the corresponding operation based on the fan adjusting instruction.

More specifically, the lamp processing unit 23 also can be the single-chip. In this embodiment, the lamp processing unit 23 receives the lamp panel control instruction sent by the main processing unit 21, and generates a lamp adjusting instruction based on the lamp panel control instruction, and controls the lamp to perform the corresponding operation based on the lamp adjusting instruction.

For example, the user gives the control instructions of "turning on the fan" and "turning up the brightness" by using the remote controller 11. The control instructions are transmitted to the main processing unit 21 through the radio signal. The main processing unit 21 receives the fan control instruction of "turning on the fan", and sends it to the fan processing unit 22. The main processing unit 21 receives the lamp panel control instruction of "turning up the brightness", and sends it to the lamp processing unit 23. After receiving the fan control instruction, the fan processing unit 22 generates the fan adjusting instruction and makes the fan rotate based on the fan adjusting instruction. After receiving the lamp panel control instruction, the lamp processing unit 23 generates the lamp adjusting instruction and turns up the brightness of the lamp based on the lamp adjusting instruction.

Figure 4:
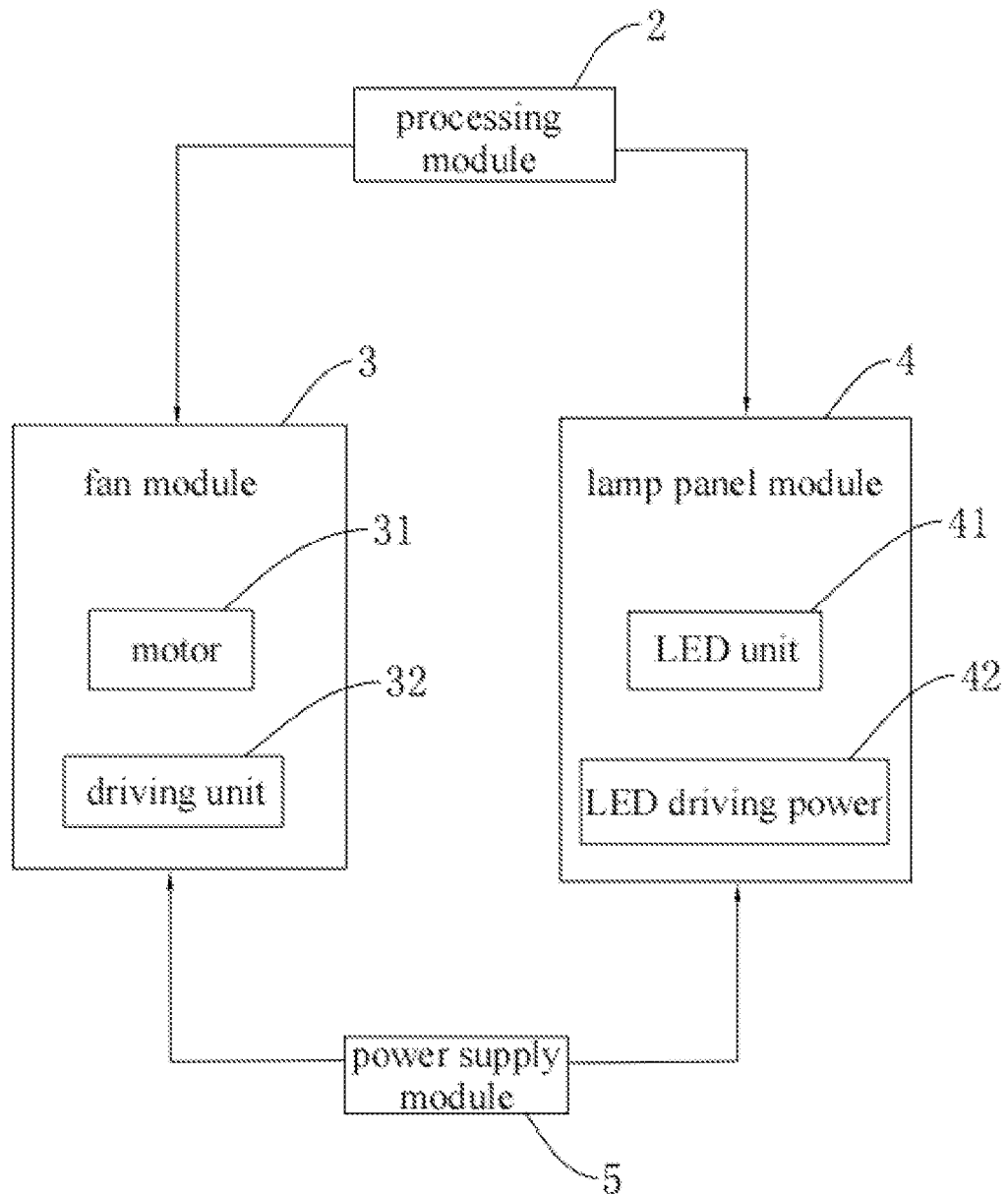
FIG. 4 is a diagram of a structure of the fan module and the lamp panel module of the fan lamp control system according to embodiments of the present application.

Specifically, referring to FIG. 4, the fan module 3 includes a motor 31 and a driving unit 32, and the driving unit 32 is connected to the fan processing unit 22 and the motor 31 respectively. The driving unit 32 is configured for receiving the fan adjusting instruction sent by the fan processing unit 22, and driving the motor 31 to perform the corresponding operation based on the fan adjusting instruction, that is, the fan can be controlled to realize a user need.

More specifically, in this embodiment, the motor 31 is a 220 V DC motor, and the driving unit 32 is a motor controller. The driving unit 32 is connected to a 220 V power supply to supply power to the motor 31. Meanwhile, the driving unit 32 receives the fan adjusting instruction, and controls the motor 31 to be turned on/off and adjusts the rotating speed of the motor 31 according to the fan adjusting instruction.

Specifically, referring to FIG. 4, the lamp panel module 4 includes an LED unit 41 and an LED driving power 42. The LED unit 41 is connected to the lamp processing unit 23, and is configured for receiving the lamp adjusting instruction sent by the lamp processing unit 23. The LED driving power 42 is connected to the LED unit 41, and is configured for supplying a 24 V voltage to the LED unit 41.

More specifically, in this embodiment, the LED unit 41 includes multiple LED lights. After the lamp processing unit 23 sends the lamp adjusting instruction, the multiple LED lights are adjusted based on the lamp adjusting instruction, so as to meet the user need.

More specifically, in this embodiment, in order to save space, the lamp processing unit 23 and the LED unit 41 are integrated together. In terms of a structure, the lamp processing unit 23 and the LED unit 41 form a lamp panel, of which the front is the multiple LED lights and the back is the single-chip for controlling the multiple LED lights.

Figure 5:
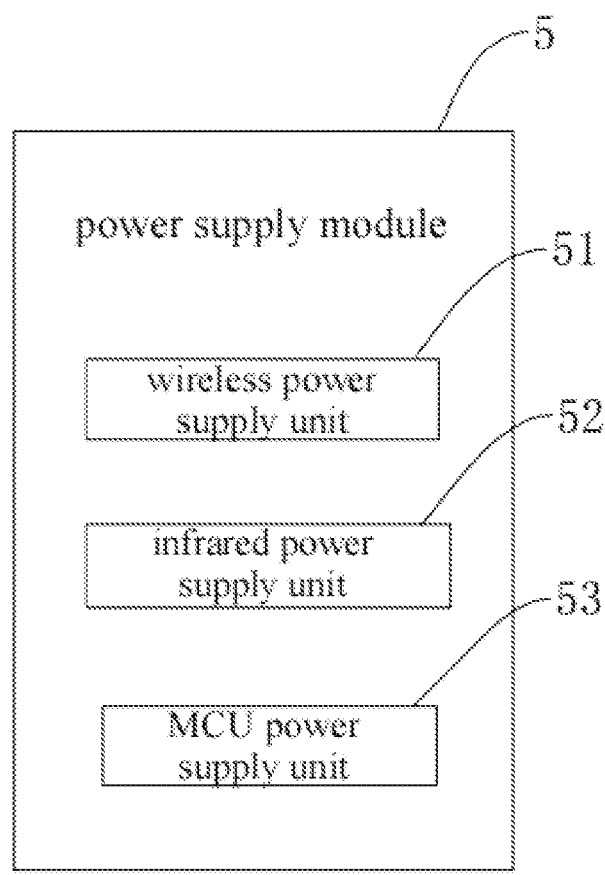
FIG. 5 is a diagram of a structure of the power supply module of the fan lamp control system according to embodiments of the present application.

Specifically, referring to FIGS. 1 and 5, the power supply module 5 includes a wireless power supply unit 51, an infrared power supply unit 52 and a MCU supply unit 53. In particular, the wireless power supply unit 51 is configured for supplying power to the wireless connecting port, and the infrared power supply unit 52 is configured for supplying power to the infrared connecting port, and the MCU supply unit 53 is configured for supplying power to the main processing unit 21, the fan processing unit 22 and the lamp processing unit 23.

An implementation principle of the fan lamp control system disclosed in the embodiments of the present application is as follows. Analyzing the location information of the remote controller 11 with the processing unit 14, and detecting the operation state of the remote controller 11 with the detection unit 15. When the detection unit 15 determines that the remote controller 11 is available, the control unit 16 selects the remote controller 11 for control, and the remote controller 11 sends the control instruction to the processing module 2 to adjust the illuminating state and the rotating state of the fan lamp. When the detection unit 15 determines that the remote controller 11 is unavailable, the control unit 16 establishes the communication connection between the fan lamp and the terminal 12, and selects the terminal 12 for control. The user can adjust the illuminating state and the rotating state of the fan lamp by using the mobile phone, the tablet PC or the computer. The system provided in present application can automatically switch to the terminal 12 control as the control mode when the remote controller 11 is unavailable, which improves a versatility and stability of the system and makes it convenient for the user to adjust the rotating state and the illuminating state of the fan lamp.

Figure 6:
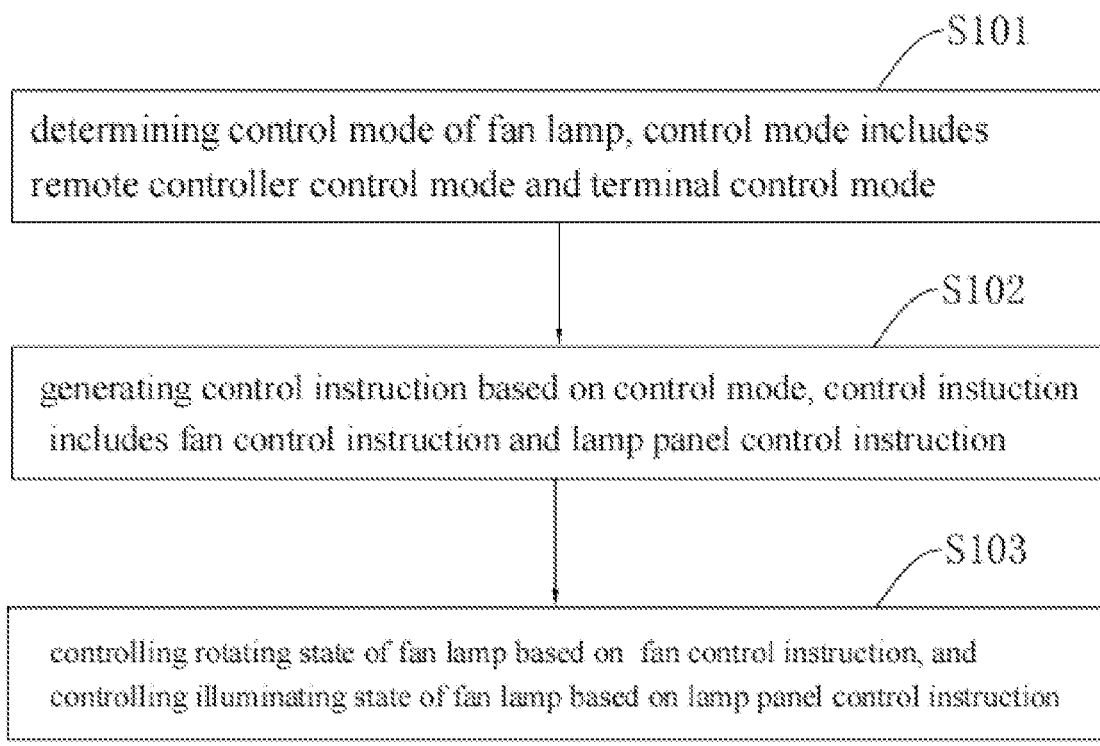
FIG. 6 is an overall flow diagram of a fan lamp control method according to embodiments of the present application.

The embodiments of the present application disclose a fan lamp control method, applied to the fan lamp control system described above. The system includes the control module 1, the processing module 2, the fan module 3, the lamp panel module 4 and the power supply module 5. The control module 1 is connected to the processing module 2, and the processing module 2 is connected to the fan module 3 and the lamp panel module 4 respectively, and the power supply module 5 is connected to the control module 1, the processing module 2, the fan module 3 and the lamp panel module 4. Contents related to the system still can refer to FIGS. 1-5. Referring to FIG. 6, the fan lamp control method includes the following steps:

S101: determining a control mode of a fan lamp; the control mode includes a remote controller control mode and a terminal control mode;

S102: generating the control instruction based on the control mode; the control instruction includes a fan control instruction and a lamp panel control instruction;

S103: controlling a rotating state of the fan lamp based on the fan control instruction, and controlling an illuminating state of the fan lamp based on the lamp panel control instruction.

Figure 7:
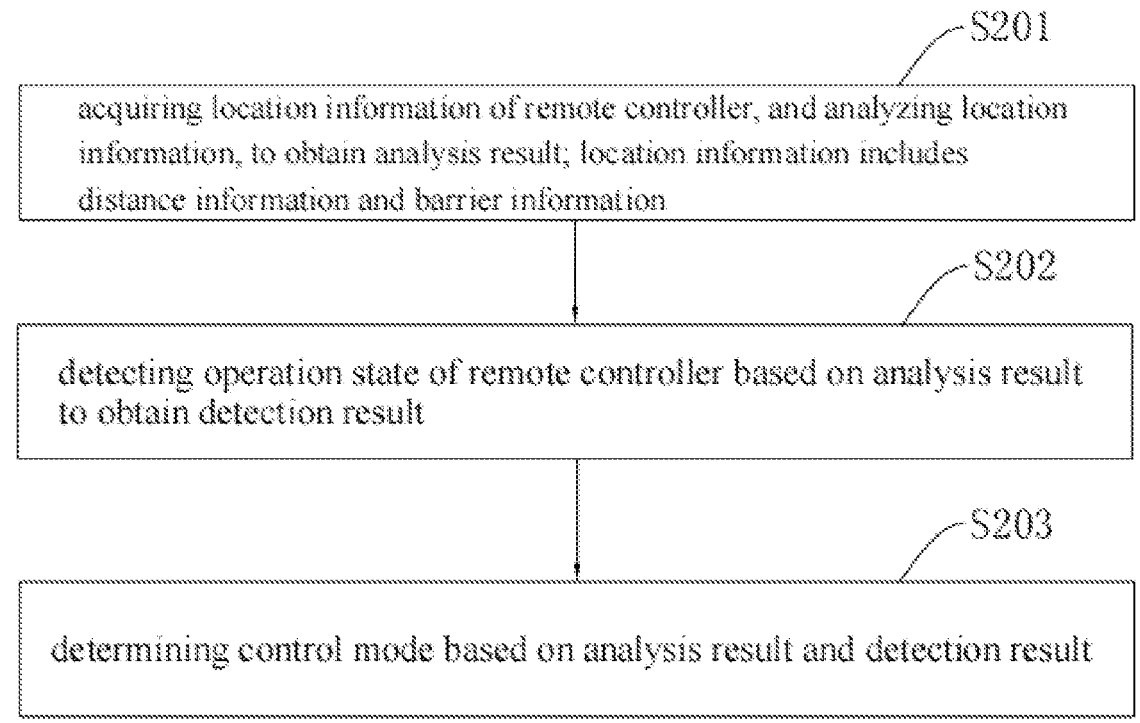
FIG. 7 is a flow diagram of steps S201-S203 in the fan lamp control method according to embodiments of the present application.

In particular, referring to FIG. 7, the step S101 includes the following steps:

S201: acquiring location information of a remote controller, and analyzing the location information to obtain an analysis result; the location information comprises distance information and barrier information;

S202: detecting an operation state of the remote controller based on the analysis result to obtain a detection result;

S203: determining the control mode based on the analysis result and the detection result.

Figure 8:
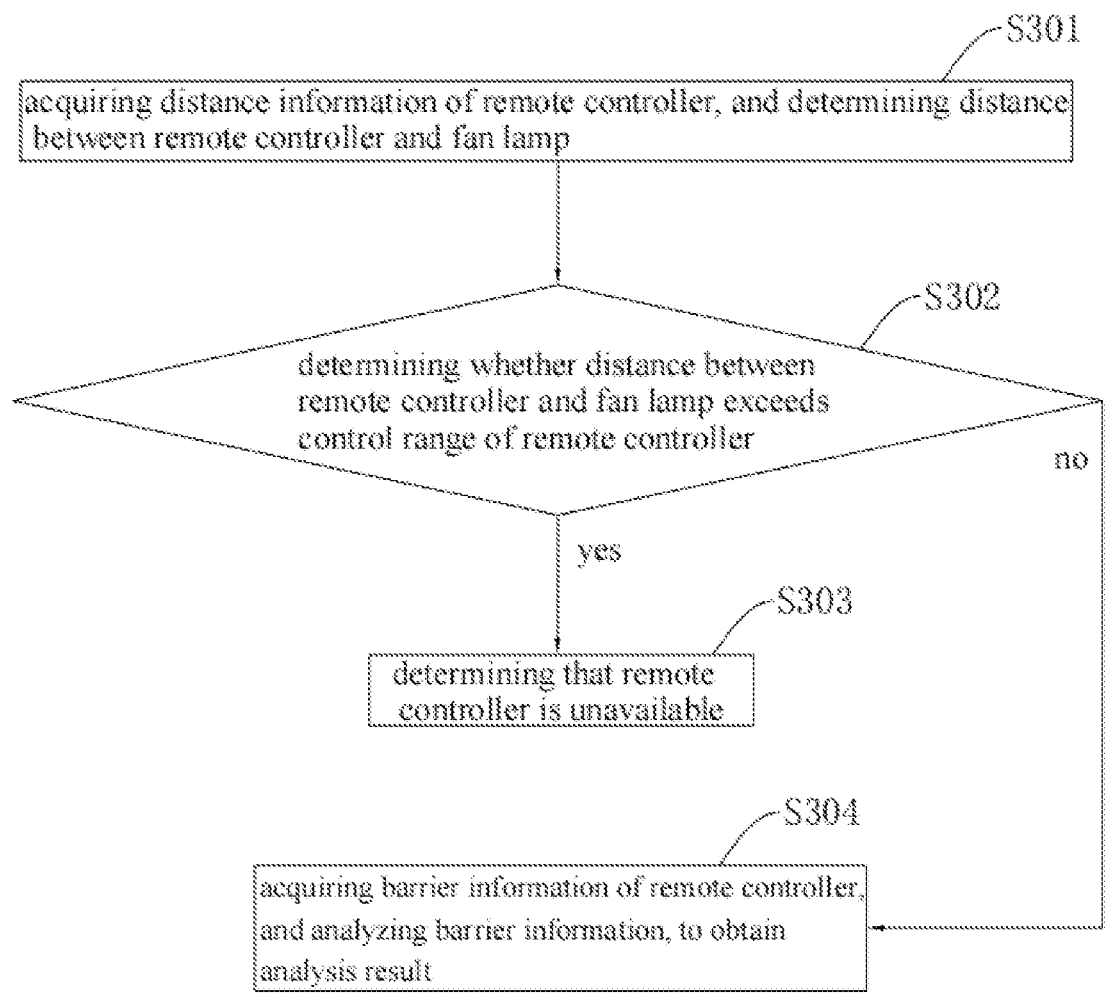
FIG. 8 is a flow diagram of steps S301-S304 in the fan lamp control method according to embodiments of the present application.

In particular, for the step 201, in this embodiment, the location model is established by using the floor plan for mounting the fan lamp. Acquiring the location information of the remote controller 11 in the location model, and the location information includes the distance information and the barrier information. The distance information indicates the distance between the remote controller 11 and the fan lamp, and the barrier information indicates whether there is the barrier wall between the remote controller 11 and the fan lamp. Referring to FIG. 8, the analyzing the location information includes the following steps:

S301: acquiring the distance information of the remote controller, and determining the distance between the remote controller 11 and the fan lamp;

S302: determining whether the distance between the remote controller 11 and the fan lamp exceeds the control range of the remote controller;

S303: the distance between the remote controller 11 and the fan lamp exceeds the control range of the remote controller, determining that the remote controller is unavailable;

S304: the distance between the remote controller 11 and the fan lamp does not exceeds the control range of the remote controller, acquiring the barrier information of the remote controller 11, and analyzing the barrier information to obtain the analysis result.

More specifically, because the control distance of the remote controller 11 is limited, for example, the control distance of the remote controller 11 is 8 m. If the distance between the remote controller 11 and the fan lamp is greater than 8 m, the remote controller 11 is unavailable; if the distance between remote controller 11 and the fan lamp is less than 8 m, the remote controller 11 can control the rotating state and the illuminating state of the fan lamp when there is no barrier wall. Establishing the circular control range by taking the fan lamp as the center of the circle and 8 m as the radius, and analyzing the location of the remote controller 11. If the remote controller exceeds the control range, the remote controller 11 is unavailable; if the remote controller 11 is in the control range, the remote controller 11 can control the rotating state and the illuminating state of the fan lamp when there is no barrier wall.

In this embodiment, using the indoor positioning technology to position the remote controller 11 and the fan lamp, and detect the distance between the remote controller 11 and the fan lamp. The available indoor positioning technology includes but is not limited to: infrared positioning technology, ultrasonic indoor positioning technology, radio frequency identification indoor positioning technology, bluetooth indoor positioning technology, WIFI indoor positioning technology, ultra wide band indoor positioning technology and ZigBee indoor positioning technology.

Figure 9:
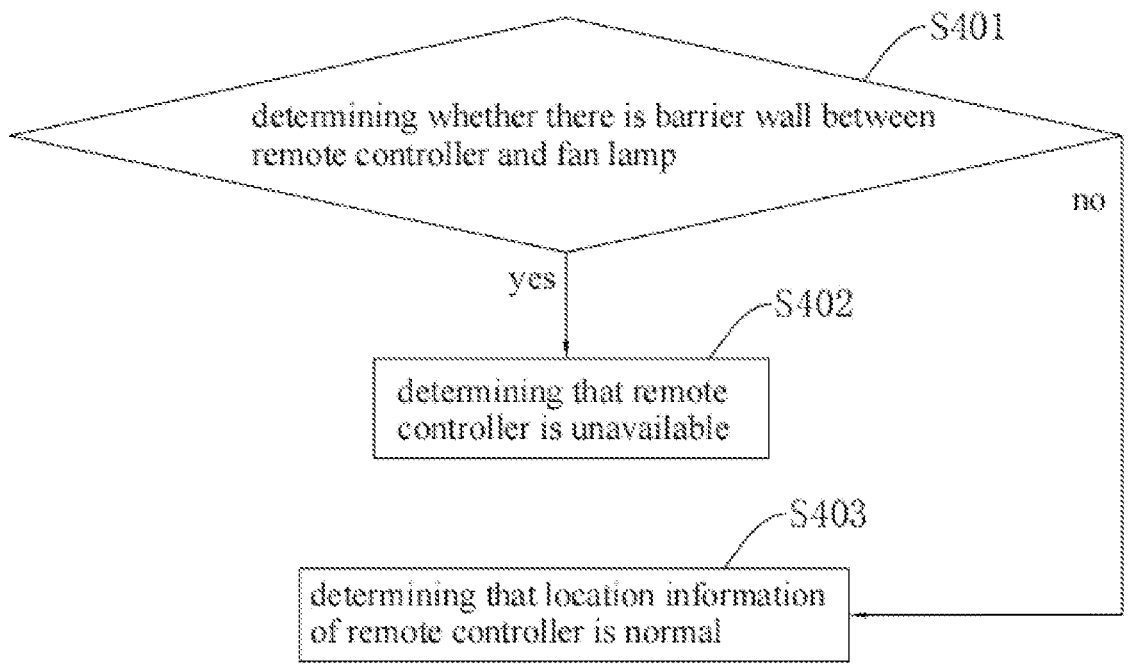
FIG. 9 is a flow diagram of steps S401-S403 in the fan lamp control method according to embodiments of the present application.

More specifically, in the step S304, if the remote controller 11 exceeds the control range, detecting the barrier information of the remote controller 11. Referring to FIG. 9, specifically including the following steps:

S401: determining whether there is a barrier wall between the remote controller 11 and the fan lamp;

S402: if there is a barrier wall, determining that the remote controller is unavailable;

S403: if there is no barrier wall, determining that the location information of the remote controller is normal.

More specifically, when the remote controller 11 is in the control range, it is also necessary to analyze the barrier information. The analysis unit 14 determines whether there is the barrier wall between the remote controller 11 and the fan lamp. If there is the barrier wall, the analysis unit 14 determines that the remote controller 11 is unavailable. If there is no barrier wall, the analysis unit 14 determines that the location information of the remote controller 11 is normal. In this embodiment, determining whether there is the barrier wall between the remote controller 11 and the fan lamp by using the way of infrared detection. The fan lamp can be mounted with the infrared emitter, and the remote controller 11 can be mounted with the optical sensor for receiving the infrared signal emitted by the infrared emitter. If the infrared signal can be received, it is determined that there is no barrier wall between the remote controller 11 and the fan lamp; if the infrared signal cannot be received, it is determined that there is the barrier wall between the remote controller 11 and the fan lamp.

Figure 10:
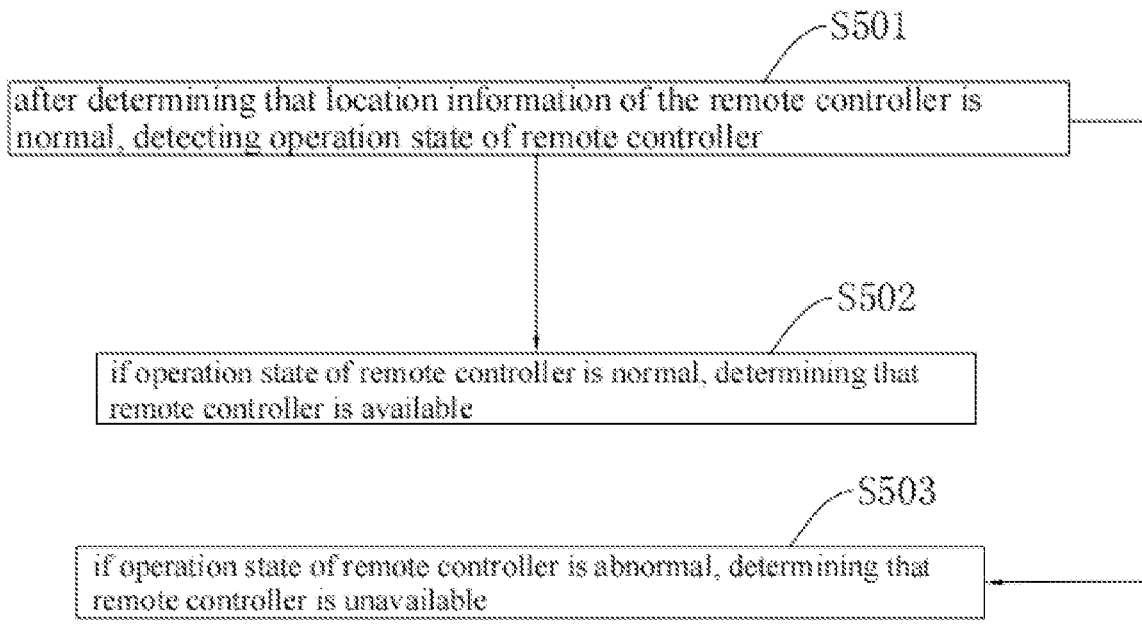
FIG. 10 is a flow diagram of steps S501-S503 in the fan lamp control method according to embodiments of the present application.

In particular, in the step S202, after determining the location information of the remote controller 11 is normal, it is necessary to detect the operation state of the remote controller 11, that is, to detect whether the remote control 11 fails. Referring to FIG. 10, specifically including the following steps:

S501: after determining that the location information of the remote controller is normal, detecting the operation state of the remote controller;

S502: if the operation state of the remote controller is normal, determining that the remote controller is available;

S503: if the operation state of the remote controller is abnormal, determining that the remote controller is unavailable;

More specifically, in this embodiment, after the user presses the button of the remote controller 11, sending an operation instruction while sending the control instruction to the processing module 2, and determining whether the remote controller 11 is in the normal operation state according to whether the fan lamp reacts. If it is detected that the fan lamp performs the corresponding operation, it is determined that the remote controller 11 is in the normal operation state, that is, the remote controller 11 is available. If it is detected that the fan lamp does not perform the corresponding operation, it is determined that the remote controller 11 is in the abnormal operation state, that is, the remote controller 11 fails and is unavailable. For example, the user presses the lamp switch button of the remote controller 11, if the lamp of the fan lamp is not turned on, it is determined that the remote controller 11 is unavailable; if the lamp of the fan lamp is turned on, it is determined that the remote controller 11 is available.

Figure 11:
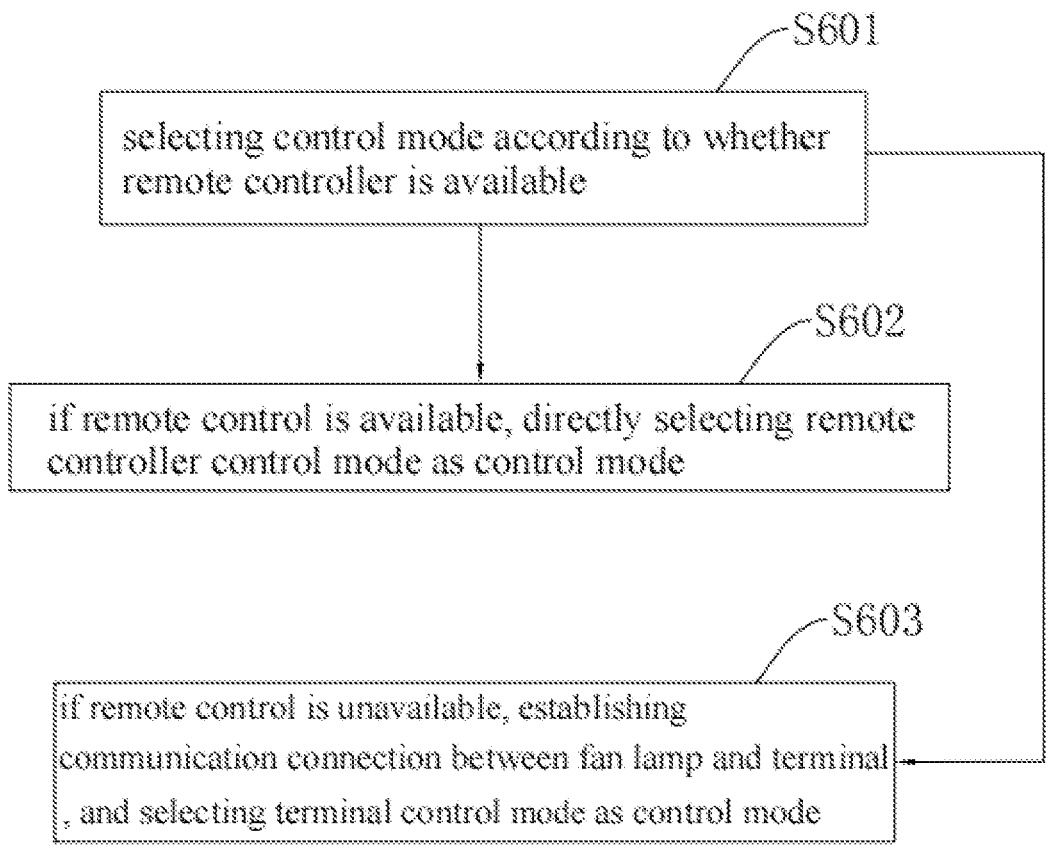
FIG. 11 is a flow diagram of steps S601-S603 in the fan lamp control method according to embodiments of the present application.

In particular, in the step S203, referring to FIG. 11, the determining the control mode based on the analysis result and the detection result specifically includes the following steps:

S601: selecting the control mode according to whether the remote controller is available;

S602: if the remote control is available, directly selecting the remote controller control mode as the control mode;

S603: if the remote control is unavailable, establishing a communication connection between the fan lamp and the terminal, and selecting the terminal control mode as the control mode;

Specifically, for selecting the control mode based on the analysis result and the detection result, when it is determined that the remote controller 11 is available, directly selecting the remote controller 11 for control; when it is determined that the remote controller 11 is unavailable, establishing the communication connection between the fan lamp and the terminal 12, and selecting the terminal 12 for control. The fan lamp is automatically switched to be controlled by the terminal 12 when the remote controller 11 is unavailable, which is convenient for the user to adjust the rotating state and the illuminating state of the fan lamp.

In particular, in the step S02, for the remote controller control mode, the remote controller 11 is provided with the remote control buttons, respectively located in the fan adjusting area and the lamp adjusting area. The remote control buttons located in the fan adjusting area include the fan switch button for turning on/off the fan and the speed adjusting button for controlling the rotating speed of the fan. The remote controller buttons located in the lamp adjusting area includes the lamp switch button for turning on/off the lamp and the adjusting button for controlling the brightness of the lamp. The user can press the corresponding button as required to issue the corresponding control instruction, and the remote controller 11 sends the control instruction to the infrared connecting port through the radio signal.

For the terminal 12 control, the terminal 12 includes the wireless connecting port connected to the processing module 2. In this embodiment, the terminal 12 can be the mobile phone, the tablet PC or the computer, installed with the APP control soft wear. The APP control soft wear contains the fan control area and the lamp control area. The fan control area contains the fan switch option for turning on/off the fan and the speed adjusting option for controlling the rotating speed of the fan. The lamp control area contains the lamp switch option for turning on/off the lamp and the adjusting option for controlling the brightness of the lamp. The user can click the corresponding option as actual required to generate the control instruction, then the mobile phone sends the control instruction to the wireless connecting port through a wireless LAN, and the wireless connecting port sends the control instruction to the processing module 2.

Specifically, the processing module 2 includes the main processing unit 21, the fan processing unit 22 and the lamp processing unit 23. In particular, the main processing unit 21 is connected to the remote controller 11 and the terminal 12 respectively to receive the control instruction sent by the remote controller 11 and/or the terminal 12. The main processing unit 21 divided the control instruction into the fan control instruction and the lamp panel control instruction according to a fan type and a lamp type, and sends the fan control instruction to the fan processing unit 22 and the lamp panel control instruction to the lamp processing unit 23.

More specifically, the main processing unit 21 can be the single-chip. By inputting the program in the single-chip, the control instruction can be divided into the fan control instruction and the lamp panel control instruction. The fan control instruction can be sent to the fan processing unit 22, and the lamp panel control instruction can be sent to the lamp processing unit 23, so that the fan processing unit 22 and the lamp processing unit 23 can respond to the corresponding control instruction.

Specifically, in the step S103, in this embodiment, the fan processing unit 22 can be the single-chip. The fan processing unit 22 receives the fan control instruction sent by the main processing unit, and generates the fan adjusting instruction based on the fan control instruction, and controls the fan to perform the corresponding operation based on the fan adjusting instruction.

More specifically, the lamp processing unit 23 also can be the single-chip. In this embodiment, the lamp processing unit 23 receives the lamp panel control instruction sent by the main processing unit 21, and generates a lamp adjusting instruction based on the lamp panel control instruction, and controls the lamp to perform the corresponding operation based on the lamp adjusting instruction.

For example, the user gives the control instructions of "turning on the fan" and "turning up the brightness" by using the remote controller 11. The control instructions are transmitted to the main processing unit 21 through the radio signal. The main processing unit 21 divided the control instruction into the fan control instruction (fan control instruction) and the lamp panel control instruction (turning up the brightness), and sends the fan control instruction to the fan processing unit 22 and the lamp panel control instruction to the lamp processing unit 23. After receiving the fan control instruction, the fan processing unit 22 generates the fan adjusting instruction and makes the fan rotate based on the fan adjusting instruction. After receiving the lamp panel control instruction, the lamp processing unit 23 generates the lamp adjusting instruction and turns up the brightness of the lamp based on the lamp adjusting instruction.

More specifically, the fan module 3 includes the motor 31 and the driving unit 32, and the driving unit 32 is connected to the fan processing unit 22 and the motor 31 respectively. The driving unit 32 is configured for receiving the fan adjusting instruction issued by the fan processing unit 22, and driving the motor 31 to perform the corresponding operation based on the fan adjusting instruction, that is, the fan can be controlled to realize the user need.

More specifically, in this embodiment, the motor 31 is the 220 V DC motor, and the driving unit 32 is the motor controller. The driving unit 32 is connected to the 220 V power supply to supply power to the motor 31. Meanwhile, the driving unit 32 receives the fan adjusting instruction, and controls the motor 31 to be turned on/off and adjusts the rotating speed of the motor 31 according to the fan adjusting instruction.

More specifically, the lamp panel module 4 includes the LED unit 41 and the LED driving power 42. The LED unit 41 is connected to the lamp processing unit 23, and is configured for receiving the lamp adjusting instruction sent by the lamp processing unit 23. The LED driving power 42 is connected to the LED unit 41, and is configured for supplying a 24 V voltage to the LED unit 41.

More specifically, in this embodiment, the LED unit 41 includes multiple LED lights. After the lamp processing unit 23 sends the lamp adjusting instruction, the multiple LED lights are adjusted based on the lamp adjusting instruction, so as to meet the user need.

More specifically, in this embodiment, in order to save space, the lamp processing unit 23 and the LED unit 41 are integrated together. In terms of the structure, the lamp processing unit 23 and the LED unit 41 form the lamp panel, of which the front is the multiple LED lights and the back is the single-chip for controlling the multiple LED lights.

More specifically, referring to FIGS. 1 and 4, the power supply module 5 includes the wireless power supply unit 51, the infrared power supply unit 52 and the MCU supply unit 53. In particular, the wireless power supply unit 51 is configured for supplying power to the wireless connecting port, and the infrared power supply unit 52 is configured for supplying power to the infrared connecting port, and the MCU supply unit 53 is configured for supplying power to the main processing unit 21, the fan processing unit 22 and the lamp processing unit 23.

The implementation principle of the fan lamp control method disclosed in the embodiments of the present application is as follows. Analyzing the location information of the remote controller 11, and detecting the operation state of the remote controller 11. When it is determined that the remote controller 11 is available, selecting the remote controller 11 for control, and sending the control instruction by using the remote controller 11 to adjust the illuminating state and the rotating state of the fan lamp. When it is determined that the remote controller 11 is unavailable, establishing the communication connection between the fan lamp and the terminal 12, and selecting the terminal 12 for control. The user can adjust the illuminating state and the rotating state of the fan lamp by using the mobile phone, the tablet PC or the computer. The method provided in present application can automatically switch to the terminal control mode as the control mode when the remote controller 11 is unavailable, which improves the versatility and stability of the system and makes it convenient for the user to adjust the rotating state and the illuminating state of the fan lamp.

The above are the preferred embodiments of the present application, which do not limit the protection scope of the present application. Therefore, any equivalent changes made according to the structure, shape and principle of the present application should fall within the protection scope of the present application.

What is claimed is:

1. A fan lamp control system, comprising: a control module, a processing module, a fan module, a lamp panel module and a power supply module; wherein, the control module is connected to the processing module, and the processing module is connected to the fan module and the lamp panel module, and the power supply module is connected to the control module, the processing module, the fan module and the lamp panel module;

the fan module is configured for controlling a rotating state of a fan;

the lamp panel module is configured for controlling an illuminating state of a lamp;

the control module is configured for sending a control instruction for controlling the rotating state of the fan and the illuminating state of the lamp; wherein the control module comprises a first control unit and a second control unit;

the processing module is configured for controlling the fan module and the lamp panel module to perform a corresponding operation based on the control instruction;

the first control unit is a remote controller;

the second control unit is a terminal;

the control instruction for controlling the rotating state of the fan and the illuminating state of the lamp is sent by the remote controller or the terminal; and the control module further comprises:
an acquisition unit, connected to the remote controller and configured for acquiring location information of the remote controller, wherein the location information comprises distance information and barrier information;
an analysis unit, connected to the acquisition unit and configured for analyzing the location information to obtain an analysis result;
a detection unit, connected to the remote controller and configured for detecting an operation state of the remote controller based on the analysis result to obtain a detection result; and
a control unit, configured for determining a control mode as a remote controller control mode or a terminal control mode based on the analysis result and the detection result and generating the control instruction.

2. The fan lamp control system according to claim 1, wherein, the analysis unit is further configured for, after acquiring the distance information of the remote controller, determining a distance between the remote controller and a fan lamp, and determining whether the distance between the remote controller and the fan lamp exceeds a control range of the remote controller;
the analysis unit is further configured for, when the distance between the remote controller and the fan lamp exceeds the control range of the remote controller, determining that the remote controller is unavailable;
the analysis unit is further configured for, when the distance between the remote controller and the fan lamp does not exceed the control range of the remote controller, acquiring the barrier information of the remote controller, and determining whether there is a barrier wall between the remote controller and the fan lamp;
the analysis unit is further configured for, when there is the barrier wall between the remote controller and the fan lamp, determining that the remote controller is unavailable; and
the analysis unit is further configured for, when there is no barrier wall between the remote controller and the fan lamp, determining that the location information of the remote controller is normal.

3. The fan lamp control system according to claim 2, wherein, the detection unit is further configured for:
after the analysis unit determines that the location information of the remote controller is normal, detecting the operation state of the remote controller;
when the remote controller is in a normal operation state, determining that the remote controller is available; and
when the remote controller is in an abnormal operation state, determining that the remote controller is unavailable.

4. The fan lamp control system according to claim 3, wherein, the control unit is further configured for:
when the detection unit determines that the remote controller is available, determining that the control mode is the remote controller control mode; and
when the analysis unit or the detection unit determines that the remote controller is unavailable, establishing a communication connection between the fan lamp and the terminal, and determining that the control mode is the terminal control mode.

5. The fan lamp control system according to claim 4, wherein, the processing module comprises:
a main processing unit, configured for receiving the control instruction sent by the control module, and generating a fan control instruction and a lamp panel control instruction based on the control instruction;
a fan processing unit, connected to the main processing unit and configured for receiving the fan control instruction sent by the main processing unit and generating a fan adjusting instruction; and
a lamp processing unit, connected to the main processing unit and configured for receiving the lamp panel control instruction sent by the main processing unit and generating a lamp adjusting instruction.

6. The fan lamp control system according to claim 5, wherein, the fan module comprises:
a 220 V direct current motor; and
a driving unit, connected to the fan processing unit and the 220 V direct current motor, and configured for adjusting a rotating state of the 220 V direct current motor based on the fan adjusting instruction.

7. The fan lamp control system according to claim 6, wherein, the lamp panel module comprises:
a light-emitting diode (LED) unit, connected to the lamp processing unit, and configured for adjusting an illuminating state of the LED unit based on the lamp adjusting instruction; and
an LED driving power, configured for supplying power to the LED unit.

8. A fan lamp control method, comprising:
determining a control mode of a fan lamp, wherein the control mode comprises a remote controller control mode and a terminal control mode;
generating a control instruction based on the control mode, wherein the control instruction comprises a fan control instruction and a lamp panel control instruction; and
controlling a rotating state of the fan lamp based on the fan control instruction, and controlling an illuminating state of the fan lamp based on the lamp panel control instruction,
wherein, the determining the control mode of the fan lamp comprises:
acquiring location information of a remote controller, and analyzing the location information to obtain an analysis result; the location information comprises distance information and barrier information;
detecting an operation state based on the analysis result to obtain a detection result; and
determining the control mode of the fan lamp based on the analysis result and the detection result.

* * * * *